United States Patent Office 3,512,475
Patented May 19, 1970

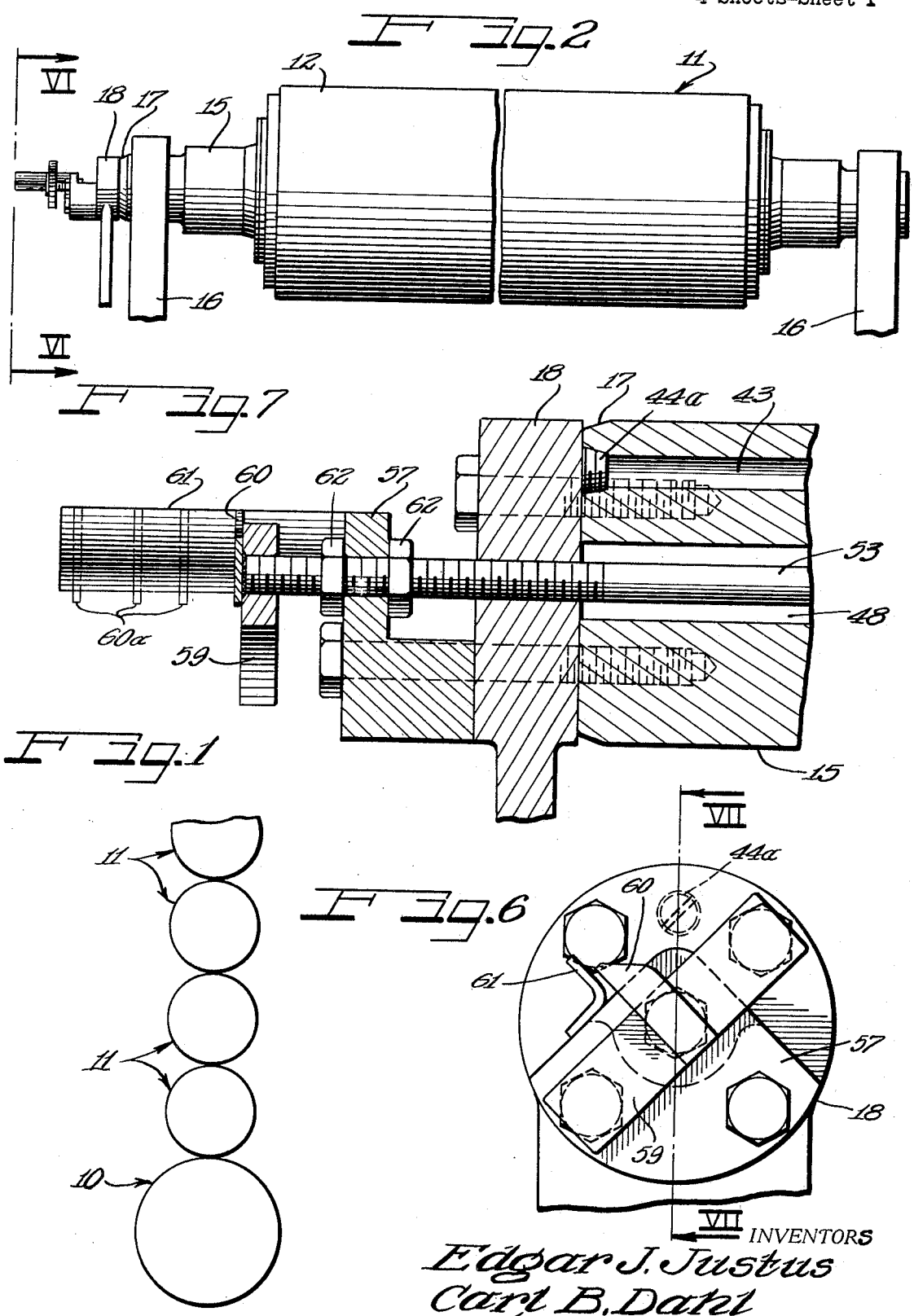

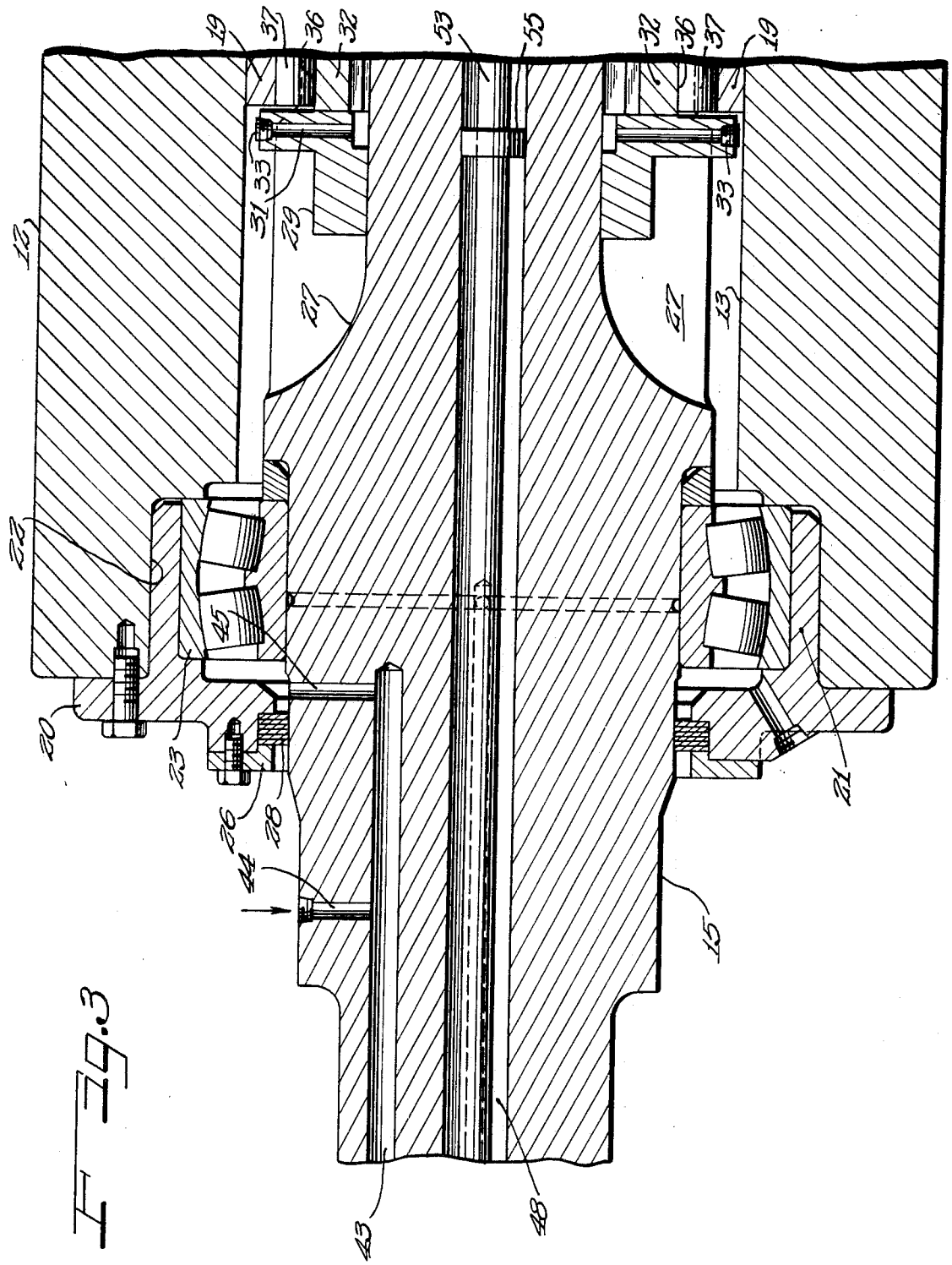

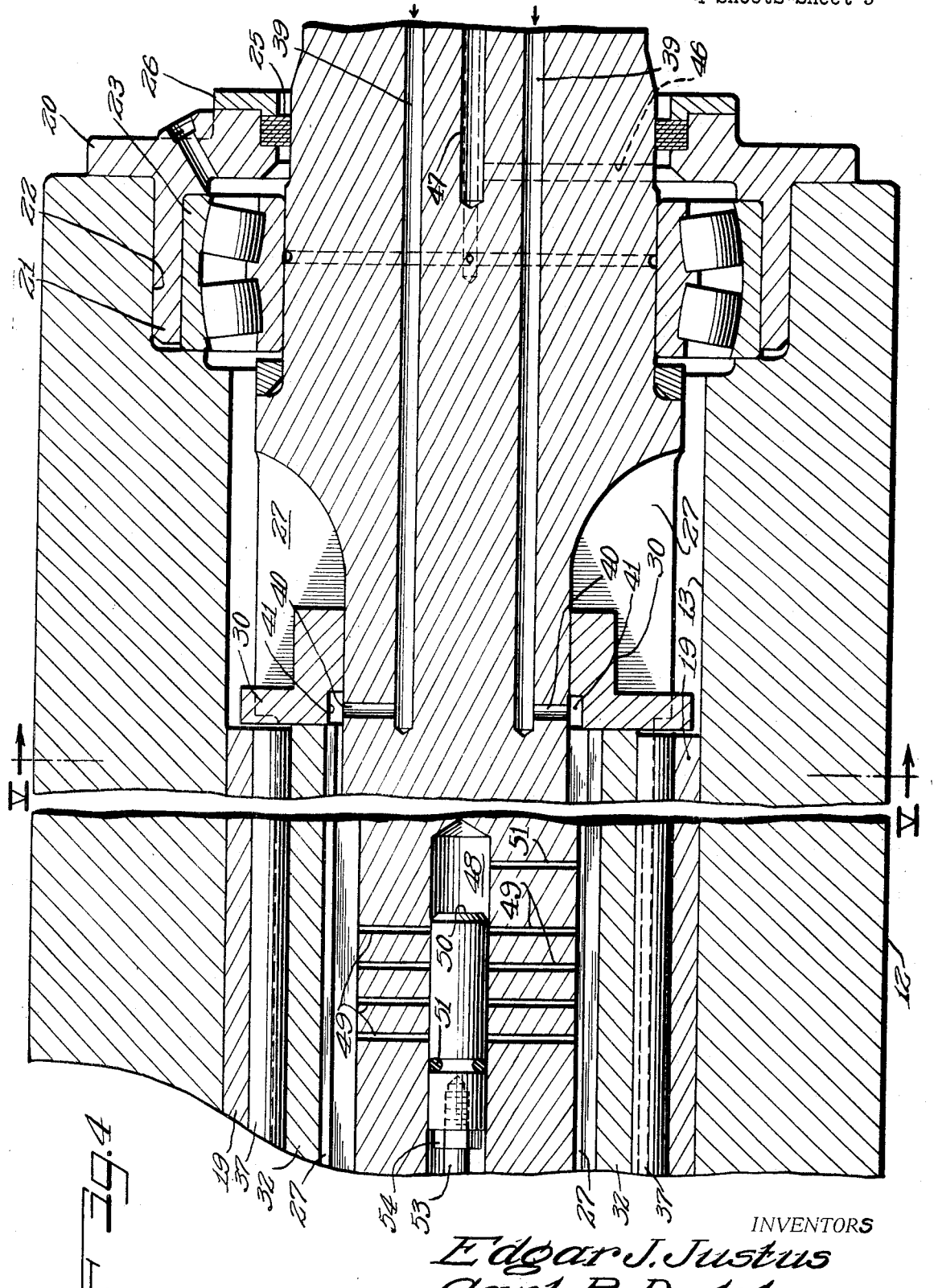

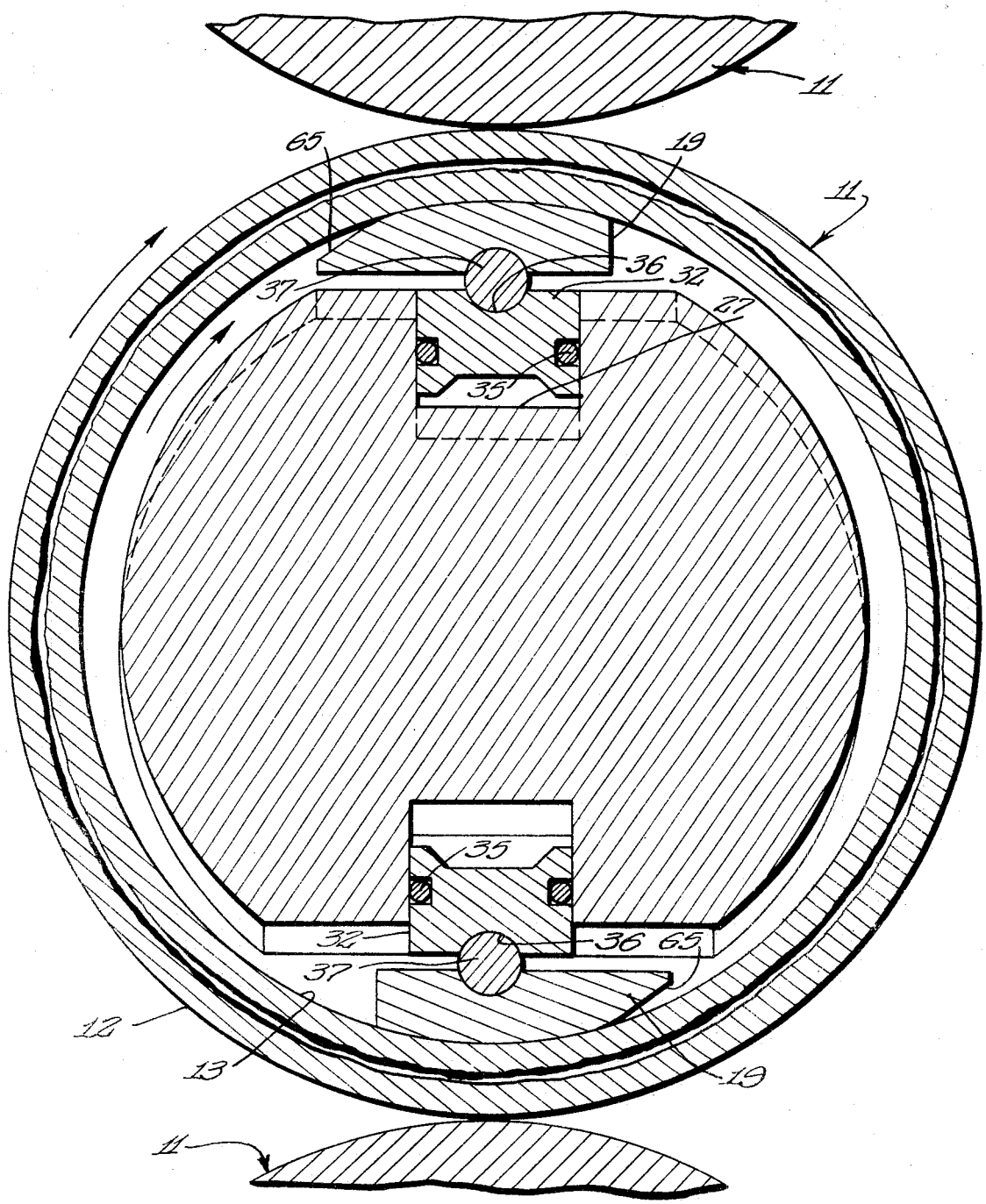

3,512,475
SELF-DAMPED CALENDER ROLL
Edgar J. Justus, Beloit, Wis., and Carl B. Dahl, Rockton, Ill., assignors to Beloit Corporation, Beloit, Wis., a corporation of Wisconsin
Continuation of application Ser. No. 572,423, Aug. 15, 1966. This application Sept. 21, 1968, Ser. No. 764,372
Int. Cl. B30b 3/04; B21b 13/02
U.S. Cl. 100—170          20 Claims

ABSTRACT OF THE DISCLOSURE

Calender roll having opposed pressure shoes reaching against the interior of the roll. Lubricant is circulated through the roll to establish a film of oil between the pressure shoes and the cylindrical interior wall of the roll to maintain the roll and lubricant at a pre-selected temperature range. Damping orifices are in communication with the pressure lines supplying pressure to pressurize the pressure shoes. A valve is provided to vary the damping effect of the damping orifices.

BACKGROUND OF THE INVENTION

This application is a continuation of application Ser. No. 572,423, filed by Edgar J. Justus and Carl B. Dahl on Aug. 15, 1966, and now abandoned.

In calendering paper and the like, the rolls in the calender stack have a tendency to vibrate as a spring. This self-excited vibration is objectionable and frequently causes barring or corrugation of the paper, resulting in a low grade product which frequently must be destroyed.

SUMMARY AND OBJECTS OF THE INVENTION

A principal object of the present invention is to remedy the foregoing deficiencies by providing a calender roll damping structure absorbing the vibration energy of the roll.

Another object of the invention is to provide an improved form of calender roll having a damping means incorporated as a part thereof to damp self-excited vibration of the roll.

Still another object of the invention is to provide a self damping calender roll having pressure shoes reacting against the interior of the roll, in which lubricant is continually circulated through the roll to establish a film of oil between the pressure shoes and interior cylindrical wall of the roll and to maintain the oil and roll at a preselected temperature range.

A still further object of the invention is to provide a self damping calender roll in which the damping means for the roll may also control deflection of the roll and loading of the nip between a next adjacent roll.

Another object of the invention is to provide an improved damping and differential loading means for a calender roll in which a damped differential loading roll may be used in each roll location of a calender stack, to damp self-excited vibration of the calender stack and enable the nips between the calender rolls to be independently loaded.

Still another object of the invention is to provide an improved form of calender stack having independent damping and nip loading means in association with the interior of each roll of the calender stack, to provide a more accurate control of the loading between the pressure nips of the calender stack.

These and other objects of the invention will more clearly appear from time to time as the following specification proceeds and with reference to the accompanying drawings wherein:

FIG. 1 is a diagrammatic view of a conventional calender stack;

FIG. 2 is a fragmentary view in side elevation of a calender roll constructed in accordance with the principles of the present invention;

FIG. 3 is a fragmentary longitudinal sectional view taken through the calender roll shown in FIG. 2 and showing one end portion of the roll;

FIG. 4 is a longitudinal sectional view showing a continuation of the roll shown in FIG. 3;

FIG. 5 is a fragmentary transverse sectional view taken substantially along line V—V of FIG. 4 but diagrammatically showing the roll center shaft in a deflected condition;

FIG. 6 is a fragmentary end view of the calender roll shown in FIG. 2, looking substantially along lines VI—VI of FIG. 2, with certain parts removed; and FIG. 7 is a fragmentary vertical sectional view taken substantially along line VII—VII of FIG. 6.

In FIG. 1 of the drawings we have diagrammatically shown a calender stack including a bottom crown roll 10 which may be driven by power in a conventional manner, and a plurality of intermediate pressure rolls 11, 11, stacked on said crown roll and forming a pressure nip with the crown roll and also effective to form individual pressure nips between each pair of intermediate rolls. The damping and deflection correcting roll of the present invention may be applied to any and all rolls of the calender stack, and is herein shown and described as applied to an intermediate roll 11 of the calender stack.

The roll 11 includes an elongated hollow roll shell 12 having an interior cylindrical wall 13 spaced radially outwardly of an inner stationary core or center shaft 15, extending through the center of said roll shell and projecting beyond opposite ends thereof. The core or center shaft 15 is shown in FIG. 2 as being supported adjacent its opposite ends on stationary supports 16, 16 which may be a part of the frame structure for the calender stack. An end 17 of the center shaft 15 projects outwardly of its support 16 and is shown as having a torque arm 18 bolted or otherwise secured thereto, for positioning a pair of diametrically opopsite pressure shoes 19, 19 in direct alignment with the nips between said roll and the next adjacent top and bottom rolls. The torque arm may be adjusted in a suitable manner and suitably held in position for holding the center shaft 15 stationary during operation of the calender roll.

The roll shell 12 is shown in FIGS. 3 and 4 as having annular end caps 20 secured to its opposite ends, having inwardly extending axial shouldered flanged portions 21 extending along annular recessed end portions 22 of opposite ends of the roll shell. The flanged portions 21 engage the outer races of self-aligning bearings 23, 23 supporting the roll shell at its opposite ends on the center shaft 15. The self-aligning bearings 23 are shown as being spherical roller bearings, but may be of any conventional form. Oil seals 25 are shown as being recessed within the annular end caps 20 and as having sealing engagement with the periphery of the center shaft 15. Annular seal retainers 26 extending within the annular caps 20 and suitably secured thereto are provided to secure the oil seals in position.

The center shaft or core 15 has two diametrically opposed outwardly opening rectangular channels or grooves 27 formed therein and extending between the bearings 23, 23 for a substantial portion of the length of the interior wall 13 of the roll shell 12. The channels 27 are closed adjacent their opposite ends by closure members 29 and 30, fitting in the ends of said channels and suitably secured and sealed thereto. The end closure members 29 have air outlet passageways 31 leading radially outwardly therefrom to accommodate the exhaust of air from the channels 27, 27 upon the fitting of rectagular pistons 32, 32 thereto, and prior to assembly of the roll shell on the center shaft. The passageways 31, 31 are closed by closure plugs 33 when air is exhausted from the channels.

The pistons 32, 32 are generally rectangular in form and are sealed to the end and side walls of the channels by O-rings 35, recessed in the side and end walls of said pistons and sealing the space between said pistons and the side walls of the channels 27 and the end closure members 29 and 30 in a conventional manner. The pistons 32, 32 have upwardly opening partially round recesses 36, 36 formed therein and extending therealong, having rock pins 37 seated therein and forming rockable mountings for the shoes 19, 19. The rock pins 37 extend for the length of the rectangular pistons 37 and are retained in position by the forces between the shoes 19 and pistons 32.

Individual fluid pressure inlet passageways 39 lead into and along the center shaft 15 for supplying hydraulic fluid under pressure to the channels 27, 27, for pressurizing the shoes 19, 19 into engagement with the interior wall 13 of the roll shaft 12. As shown in FIG. 4, each passageway 39 leads axially along the center shaft to one side of the center thereof and terminates into a radial passageway 40, opening to a recess or passageway 41 in the end closure 30, and having communication with the channel 27, to supply fluid under pressure thereto. A lubricant passageway 43 leads axially into the center shaft 15, eccentric of the center thereof, to supply lubricant to the bearings 23, 23 and the interior of the roll shell. The lubricant passageway 43 is shown in FIG. 7 as being closed at its outer end by a pipe plug 44a, abutting the inside of the torque arm 18. A cross drilled passageway 44 disposed outwardly of the roll shell 12, leads into the center shaft 15 and has communication with the lubricant passageway 43, to supply lubricant thereto. A second cross-drilled passageway 45 opens to the bearing 23 on the inside of the seal 25, for supplying lubricant to said bearing. A cross drilled passageway 46 leads from the opposite bearing 23 and has communiaction at its inner end with an axially extending passageway 47, shown as extending outwardly along the center shaft 15. The passageway 47 may open to the end of said center shaft and have communication with a tank (not shown), for returning oil to said tank.

A pump (not shown) in communication with a tank (not shown) may thus maintain a continuous circulation of oil to lubricate the bearings 23, 23 and build up a film of oil between the shoes 19 and the interior wall 13 of the roll shell 12. This circulation of oil forming a good heat transfer medium and wiped from the wall 13 by the shoes 19, 19 may thus enable the temperature of the oil within the roll shell to be controlled, preventing excessive heating thereof as well as serving to maintain the temperature of the roll shell within a predetermined temperature gradient.

Referring now in particular to the novel form of self-damping structure of the invention, a valve passageway 48 leads along the center of the shaft 15 from the end thereof adjacent to the torque arm 18 and terminates beyond the transverse center of said center shaft.

A plurality of cross drilled damping or energy absorption orifices 49 lead to the valve passageway 48, from the diametrically opposed channels 27, 27. The orifices 49, 49 thus provide an energy absorption restriction to the flow of fluid from one channel to the other, set up by the tendency of the roll shell 12 to vibrate. The cross-sectional area of flow restriction between the two channels 27, 27 is shown as being varied by a valve piston 50, slidably mounted in the valve passageway 48 and sealed therto outwardly of the restriction orifices 49, as by an O-ring seal 51. The valve 50 may thus close all of the flow restriction orifices 49, or open a selected number of said orifices to provide the required damping effect. A relief passageway 51 leads from one channel 27 to the valve passageway 48.

The valve 50 has an operating rod 53 threaded therein and extending along the valve passageway 48 beyond the outer end thereof. A lock nut 54 threaded on the rod 53 is provided to lock the rod to said valve. A land 55 on the rod 53, intermediate the ends thereof, forms a guide and seal for said rod 53, intermediate the ends thereof, to hold the rod in axial alignment with the center of the passageway 48 and thereby accommodate free movement of the valve 50 along said passageway 48. The outer end of the rod is shown as being threaded and as slidably extending through the torque arm 18 and through a parallel arm 57, spaced axially outwardly of said torque arm, for rectilinear adjustable movement along said passageway. A hand grip 59 is mounted on the other end of the rod 53 and is shown as being welded thereto to afford a means for axially moving the rod 53 and valve 50 along the valve passageway 48, to open or close a selected member of restriction orifices 49, to vary the damping effect of the orifices 49, as required. The hand grip 59 has an indicator 60 extending therefrom cooperating with indicia members 60a spaced along a plate 61. Four indicia members 60a are provided, each one corresponding to an aligned set of orifices 49 to indicate the position of the valve 50 with respect to the flow restriction orifices 49. The plate 61 may be welded or otherwise secured to the arm 57 in radially spaced relation with respect to the rod 53 and extends axially outwardly of said arm parallel to the rod 53. A pair of lock nuts 62 serve to lock the rod 53 and valve 50 in a selected position of adjustment.

In operation of the device, lubricant is continually supplied to the line 44 by means of a suitable pump (not shown) to lubricate the bearings 23, 23 and build up a film of lubricant along relieved leading end portions 65, 65 of the shoes 19, 19, and maintain a supporting film of oil between the outer peripheral surfaces of the shoes 19 and the interior cylindrical wall 13 of the roll shell 12. Excess oil is returned through the return lines 46 and 47 to tank (not shown) and recirculated through the roll shell and thus maintains the temperature of the oil and the roll shell to a preselected temperature range.

The lines 39, 39 may also be supplied with hydraulic fluid under pressure under the control of suitable valve means (not shown) to supply oil to the channels 27, to load the shoes 19, 19 to a predetermined pressure, sufficient to take sag or deflection out of the roll and to load the pressure nips between adjacent rolls of the calendar stack. Pressure may then be held in the channels 27, 27 to pressurize the pistons 32 and shoes 19. Assuming the valve 50 is set to open one or more sets of damping orifices 49, to provide the restriction required to damp self-excited vibration of the rolls, the tendency of the roll to vibrate will tend to force the hydraulic fluid through the selected orifices 49, 49 from one channel 27 to the other, and absorb vibrational energy in a conventional manner. The pressure on the pistons 32, 32 may set the total pressure on the calender stack, and the shoes 19, 19 acting in diametrically opposite relation with each other besides damping vibration may be loaded to take out deflection or sag of the roll.

It may also be seen that the principles of the invention may be applied to one roll or to each roll of the calender stack to free the rolls from vibration and to load each nip of the stack independently of the other nips of the stack, as required for a particular calendering operation.

While we have herein shown and described one form in which the invention may be embodied:, it may readily be understood that various variations and modifications in the invention may be attained without departing from the spirit and scope of the novel concepts thereof.

We claim as our invention:
1. In a roll for forming a pressure nip with at least one other roll,
a rotatable roll shell,
a shaft extending within said roll shell, first and second non-rotatable force transferring means on said shaft and having supporting engagement with the interior of said roll shell on opposite sides of said shaft, and coextensive with the length of said roll shell and providing force transferring and vibration damping cooperation between said shaft and the interior of said roll shell, said first force transferring means acting toward the nip formed between said roll shell and said one other roll.

2. A roll shell in accordance with claim 1, wherein the means reacting on said first and second force transferring means includes fluid pressure means.

3. A roll shell in accordance with claim 2, wherein the shaft and the first and second force transferring means are non-rotatable.

4. A roll shell in accordance with claim 3, wherein the force transferring means comprise a pair of diametrically opposed fluid pressure operated shoes, and wherein means are provided to supply fluid under pressure to pressurize said shoes.

5. A roll shell in accordance with claim 4, wherein means are provided to circulate lubricant through said roll shell independently of said fluid pressure means, to build up a lubricating film between said shoes and the inner wall of said shell.

6. In a calender stack,
a plurality of stacked rolls defining pressure nips therebetween including,
an intermediate roll and outer rolls having pressure nips with said intermediate roll on opposite sides of said intermediate roll,
said intermediate roll including a hollow roll shell having an interior cylindrical wall,
a non-rotatable shaft within said shell,
first and second non-rotatable fluid pressure force transferring means on opposite sides of said shaft, coextensive with the length of said roll shell and providing force transferring cooperation between said shaft and said interior cylindrical wall of said roll shell in the region of the pressure nips between said rolls, and damping vibration of said rolls.

7. In a calender stack, a bottom crown roll and a plurality of vertically stacked calender rolls stacked thereon, said calender rolls each including,
a stationary center shaft,
a roll shell extending about said center shaft and inwardly of the ends thereof,
bearing means rotatably supporting said roll shell on said center shaft,
a pair of diametrically opposed elongated outwardly opening channels in said center shaft and extending between said bearing means,
an individual elongated piston in each channel and sealed thereto,
an individual pressure shoe extending for substantially the length of each piston,
fluid pressure passageways leading along said center shaft and having communication with said channels for supplying fluid under pressure thereto, to load said pressure shoes and the calender nips between said calender rolls to predetermined nip pressures,
and flow restriction means leading through said center shaft and connecting said channels together and providing sufficient energy absorption restriction to damp self-excited vibration of said rolls.

8. A calender stack in accordance with claim 7, wherein the flow restriction means comprises a plurality of energy absorption orifices connected between said channels,
and wherein valve means are provided to selectively connect said orifices with said channels and to vary the energy absorption restriction between said channels.

9. A calender stack in accordance with claim 7, wherein a circulation of oil is maintained through said center shaft and the interior of said roll shell to effect lubrication of said bearings and to provide a film of oil between said shoes and the cylindrical interior of said roll shell.

10. In a roll subject to deflection and having a pressure nip with at least on other roll,
a cylindrical roll shell,
a non-rotatable center shaft extending axially along the center of said roll shell,
bearing means supporting said roll shell on said center shaft,
opposed pressure means carried by said center shaft and having slidable engagement with the inner periphery of said roll shell,
means supplying hydraulic fluid under pressure to said pressure means,
and flow restriction means connected between said means supplying fluid under pressure to said pressure means and restricting the flow of fluid between said opposed pressure means and providing sufficient energy absorption flow restriction to damp self-excited vibration of said roll shell.

11. A roll in accordance with claim 10, wherein the flow restriction means comprises a plurality of damping orifices leading from said channels,
and wherein valve means are provided to vary the flow restriction through said damping orifices.

12. A roll in accordance with claim 10, wherein lubricating passageways lead into and from the interior of said roll shell for building up a film of oil between said pressure means and the interior wall of said roll shell, and to accommodate the circulation of lubricant into and out of said roll shell.

13. A roll subject to vibration and having a pressure nip with at least one other roll comprising:
a roll shell having a cylindrical interior wall,
a non-rotatable center shaft extending axially along the center of said roll shell beyond opposite ends thereof,
means supporting and holding said center shaft from rotation,
bearing means rotatably supporting said roll shell, on said center shaft,
two diametrically opposed elongated outwardly opening channels in said center shaft and extending between said bearing means,
an elongated piston sealed to each chanenl for radial extensible and retractible movement with respect thereto,
a pressure shoe extending for substantially the length of each piston,
fluid pressure passageways leading to said channels supplying fluid under pressure to pressurize said pressure shoes,
and flow restriction means connecting said channels together,to provide an energy absorption restriction to damp self-excited vibration of sadi roll shell.

14. A roll in accordance with claim 13, wherein the flow restriction means comprises a plurality of flow restriction orifices leading through said center shaft and having communication with said channels,
and wherein valve means are provided in said center shaft for movement therealong for varying the energy absorption effect of said orifices.

15. A roll in accordance with claim 13, wherein lubricant passageways lead into and from said roll shell, providing a circulation of lubricant to lubricate said bearing means and build up a film between said shoes and said interior cylindrical wall.

16. In a roll subject to vibration and having a pressure nip with at least one other roll,
a stationary center shaft, a roll shell journalled for rotation about said center shaft, pressure means carried by said center shaft and engaging the inner periphery of said roll shell, fluid pressure means loading said pressure means, flow restriction means connected with said fluid pressure means and restricting the flow of fluid therefrom, and providing sufficient energy absorption flow restriction to damp self-excited vibration of said roll shell, and valve means operable to vary the damping effect of said flow restriction means.

17. A roll in accordance with claim 16, wherein the flow restriction means comprises a plurality of flow restriction orifices leading from said fluid pressure means, and wherein the valve means controls the flow of fluid through selected ones of said orifices.

18. A roll subject to vibration and having a pressure nip with at least one other roll comprising, a roll shell having a cylindrical interior wall, a non-rotatable center shaft extending axially along the center of said roll shell, means supporting and holding said center shaft from rotation, bearing means rotatably supporting said roll shell on said center shaft, an elongated outwardly opening channel in said center and extending between said bearing means, a pressure shoe rockably mounted on said piston for engagement with the cylindrical interior wall of said roll shell and extending for substantially the length of said piston, a fluid pressure inlet to said channel pressurizing said pressure shoe, and at least one flow restriction orifice leading from said channel and providing the energy absorption flow restriction to damp self-excited vibration of said roll shell.

19. A roll shell in accordance with claim 18, wherein a plurality of flow restriction orifices lead from said channel, and wherein valve means are provided to selectively open and close said orifices to provide the flow restriction orifice area to damp self-excited vibration of said shell.

20. A roll shell in accordance with claim 18, wherein lubricant passageways lead into said roll shell through said center shaft for lubricating said bearing means and providing a film of lubricant between said shoe and the interior cylindrical wall of said roll shell, and wherein outlet lubricant passageways are provided to accommodate a continuous circulation of lubricant through said roll shell.

References Cited

UNITED STATES PATENTS

| | | | |
|---|---|---|---|
| 2,395,915 | 3/1946 | Specht | 100—155 |
| 2,950,507 | 8/1960 | Keyser. | |
| 3,050,829 | 8/1962 | Appenzeller. | |
| 3,111,894 | 11/1963 | Murray | 100—162 |
| 3,119,324 | 1/1964 | Justus | 100—170 |
| 3,131,625 | 5/1964 | Kusters et al. | 100—170 |
| 3,199,442 | 8/1965 | Kuno et al. | 100—163 |
| 3,266,414 | 8/1966 | Wahlstrom et al. | 100—163 |
| 3,389,450 | 6/1968 | Robertson | 100—170 XR |

FOREIGN PATENTS

| | | |
|---|---|---|
| 700,983 | 12/1964 | Canada. |
| 712,794 | 7/1965 | Canada. |
| 1,026,207 | 4/1966 | Great Britain. |
| 383,087 | 12/1964 | Switzerland. |
| 6509484 | 2/1966 | Netherlands. |

PETER FELDMAN, Primary Examiner

U.S. Cl. X.R.

29—116